C. KINNEY.
TRACTOR.
APPLICATION FILED AUG. 4, 1919.
1,341,181.
Patented May 25, 1920.
3 SHEETS—SHEET 3.
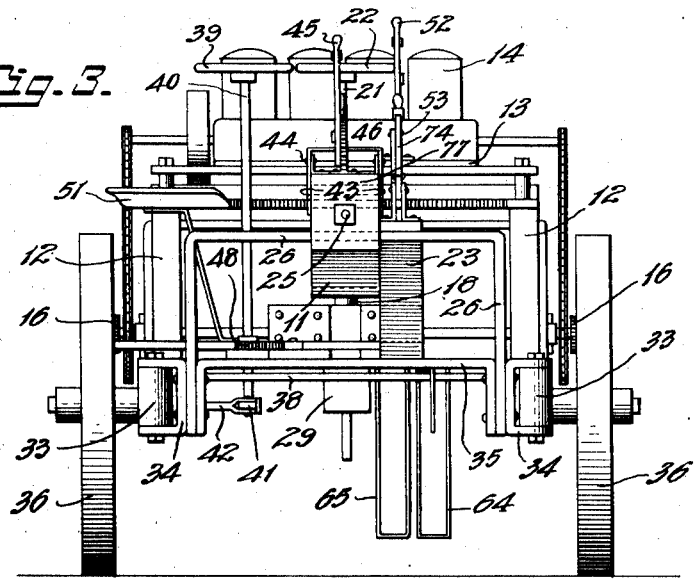
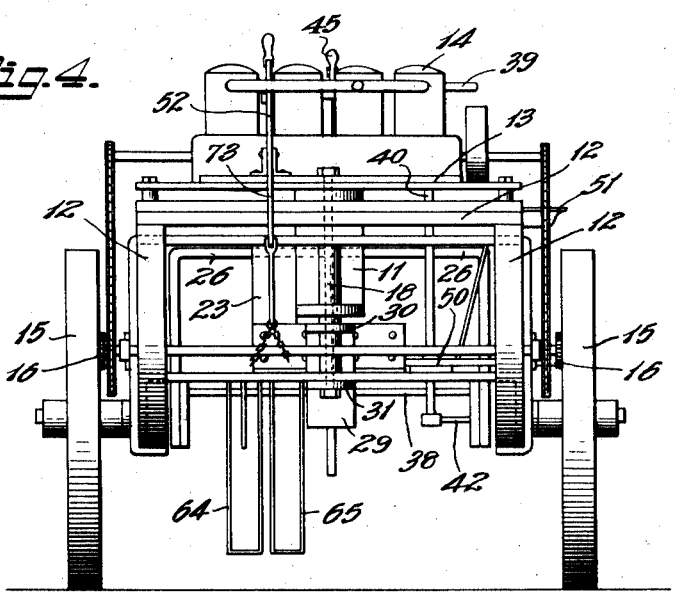
Inventor
Charles Kinney,
Attorneys

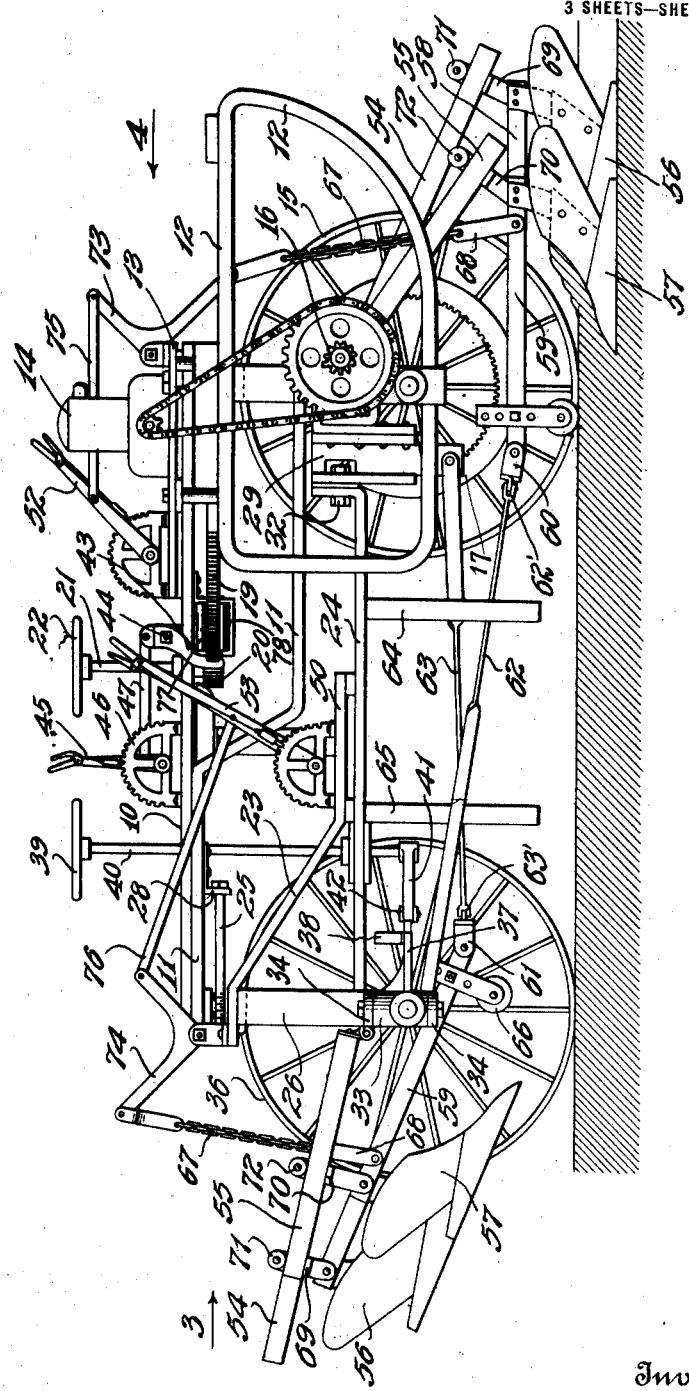

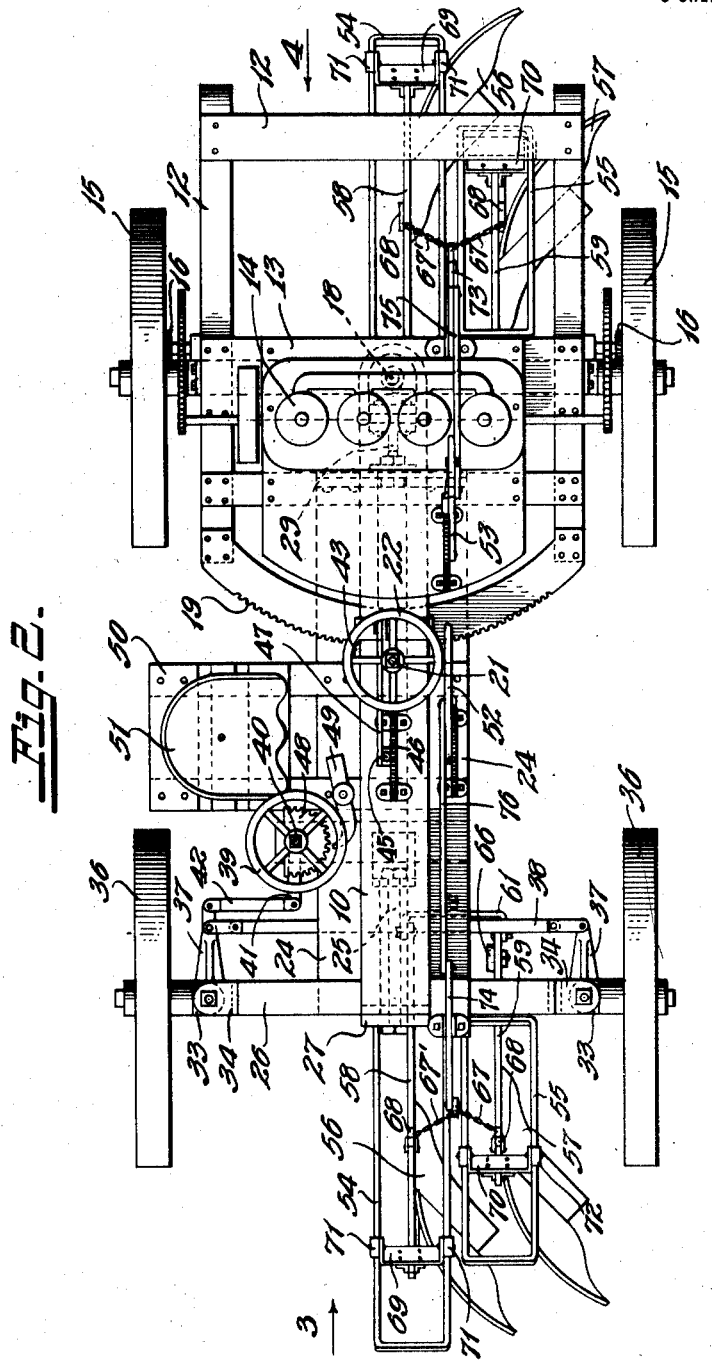

UNITED STATES PATENT OFFICE.

CHARLES KINNEY, OF ELMIRA, NEW YORK, ASSIGNOR OF ONE-HALF TO LOUISE MAY OSTRANDER, OF ELMIRA, NEW YORK.

TRACTOR.

1,341,181.     Specification of Letters Patent.     Patented May 25, 1920.

Application filed August 4, 1919. Serial No. 315,148.

*To all whom it may concern:*

Be it known that I, CHARLES KINNEY, a citizen of the United States, residing at Elmira, in the county of Chemung and State of New York, have invented certain new and useful Improvements in Tractors, of which the following is a specification.

This invention relates to tractors and has for an object to provide a tractor of improved type capable of traveling with equal facility in either direction, adapted especially for conjunction with plows carried upon either end, turning furrows in the same direction, but not limited in its utility to such function.

A further object of the invention is to provide a tractor embodying an articulated frame, movement between the parts of which serves to steer the tractor, while at its opposite end an auxiliary or supplemental means is provided for steering the tractor when operating in the opposite direction.

A further object is to provide improved means and mechanism for carrying into effect the preceding and other objects which will be apparent in the description and claims.

Referring to the accompanying drawings which are made a part hereof, and on which similar reference characters indicate similar parts, Figure 1 is a view of the tractor in side elevation showing one gang of plows in operative relation, another gang of plows in inoperative relation with proximate wheels removed, Fig. 2 is a top plan view of the tractor, Fig. 3 is a view of the tractor in end elevation with the plows removed, as indicated by arrow 3 at Figs. 1 and 2, Fig. 4 is a view of the tractor in end elevation with the plows removed, as indicated by arrow 4 of Figs. 1 and 2.

The improved tractor which forms the subject matter of this application comprises a beam or bar 10 which constitutes the backbone of the framework having a brace member 11 secured thereto, both beams 10 and 11 extending to both ends of the frame and carried upon the wheeled structure. The wheeled structure at one end comprises a frame 12 having a platform 13 erected thereon upon which is carried the prime mover 14 of any approved type, here shown as a conventional explosive engine. The frame 12 also carries wheels 15 journaled thereto and driven from the motor in any approved manner, as by the pinions 16 intergeared with the gear rings 17 carried by the wheels.

The frame 12 is articulated upon the backbone 10 by means of a king bolt 18 whereby the said frame is free to rotate in a normally horizontal plane relative to the back-bone and to carry therewith the wheels, platform 13 and the prime mover supported thereon. To control the pivotal movement of the frame 12 relative to the back-bone 10, a segmental gear 19 is rigidly secured to the frame 12 and is engaged by a pinion 20 carried upon the shaft 21, which in turn carries the steering wheel 22.

It is obvious therefore by manipulating the steering wheel 22 the frame 12 and the wheels 15 are moved as to their parallelism relative to the back-bone whereby steering of the vehicle may be accomplished. The steering accomplished by means of changing the parallelism of the frame 12 relative to the back-bone 10 is for use preferably with a vehicle traveling in the direction indicated by the arrow 3 at Figs. 1 and 4.

As it is an object of the present invention to construct a tractor capable of traveling with facility in either direction, it is obvious that steering means when traveling in the direction indicated at arrow 4 in Figs. 1 and 4, is necessary. It is also necessary to provide means for compensating for variation of the planes upon which the several wheels of the tractor are located which said means consists of the brace 23 and reach 24 secured to the back-bone by means of a hinge comprising the bolt 25 pivoted to the front axle 26 by means of a plate 27 rigidly secured to the axle 26 and by the ear 28 carried rigidly by the back-bone 10. Pivoted also to the frame 12 is a member 29 preferably, though not necessarily, a short section of I-beam which is pivoted to the frame by means of ears 30 and 31 embracing the king bolt 18. To this I-beam structure 29 the reach 24 is pivoted on a normally horizontal axis 32 whereby in conjunction with the hinge represented by the rod 25 the structure comprising the brace 23 and reach 24 is free to pivot a limited distance relative to the frame 12 both about a vertical pivot and about its normally horizontal pivots 25 and 32.

To the front axle 26 steering knuckles 33 are pivoted in any approved manner, as by the clips 34 rigidly secured to the axle 26 with a brace bar 35 extending transversely across between the downwardly extending portions of the axle 26. Upon the steering knuckles 33 wheels 36 are journaled in substantially the usual and ordinary manner with arms 37 connected by link 38 and controlled by the steering wheel 39. The means of transmitting motion from the steering wheel 39 to the arms 37 is a shaft 40 carrying an arm 41 which is connected by means of a link 42 with one of the steering arms 37 and by reason of the link 38 joining the two steering arms 37 the wheels 36 are pivoted upon their steering knuckles 33.

As the tractor is, as hereinbefore stated, designed for travel in either direction, it is necessary to lock the steering mechanism at what would be the rear of the tractor when so traveling in either direction. For this purpose detents 43 are pivoted at 44 and controlled by a lever 45 connected pivotally with the usual segments 46 and having a link 47 connected with the detents 43. The movement of the lever 45 in the direction indicated by the arrow 3 will throw the detents out of engagement with the segment 19 and moving it in the direction indicated by the arrow 4, will throw the detents into such engagement and lock the frame 12 relative to the back-bone 10. The position of the wheel 36 as affects parallelism with the back-bone 10 may be controlled by any approved manner, as for instance, by applying a segment 48 to the steering shaft 40 and a detent 49 for engaging such segment. The steering apparatuses at either end of the vehicle may therefore be either locked or unlocked at will and the tractor therefore made available for travel in either direction with equal facility.

For convenience a platform 50 extends outwardly from the reach 24 upon which is located a seat 51 for the operator contiguous to the steering wheels 39 and 22 and also to the levers 52 and 53 which control the plows. The manner of mounting the plows upon the tractor structure forms no part of the present invention but will be described for the purpose of making a complete and utilitarian device. To the opposite ends of the tractor structure rectangular frames 54 and 55 are hinged, the frames 54 being preferably longer than the frame 55 for the purpose of carrying the plows 56 mounted in the rear of the plows 57, the plows being shown in the drawings as being mounted in gangs of two. The plows 56 and 57 are respectively provided with beams 58 and 59 each of such beams 58 and 59 being attached to a yoke 60 and 61 with draw bars 62 and 63 extending from any approved rigid parts of the tractor structure through guides 64 and 65 attached to yokes 60 and 61 by the pivot joints 62' and 63' respectively whereby vertical and swinging movement of the plows is permitted. Casters 66 are provided under the plow beams in the usual well known manner whereby the depth of the furrow is controlled by adjustment of the casters irrespective of the position of the tractor frame.

To the beams 58 and 59, respectively, chains 67 and 67' are attached by means of clips 68. To insure the proper positioning of the plows both in operative and inoperative positions, the beams 58 and 59 are respectively provided with cross bars 69 and 70 which engage under the frames 54 and 55 when elevated with the beams and their accompanying frames, bell-crank levers 73 and 74 are respectively connected with the levers 52 and 53 by links 75 and 76, the bell-crank levers 73 and 74 being respectively connected with the chains 67 and 67'. It is obvious that by manipulation of the levers 52 and 53 in the usual well known manner, the plows 56 and 57 may be raised or lowered to operative or inoperative positions as shown in Fig. 1.

For the purpose of rigidity and at the same time to permit the swinging of the frame 12, rollers 77 and 78 are journaled upon each side of the segmental rack 19 permitting the free swinging of the rack, but preventing vibration.

With the tractor equipped with the plows as its load it is obvious that when driven in either direction the plows at the rear of the tractor, considering its direction of travel, will be drawn in operative or plowing position, while those at the front or forward end will be raised into inoperative position. Upon return of the tractor, the position of the plows will be reversed, whereby the plows, all turning in the same direction, will continue to operate without the necessity of turning the tractor, and when the conditions of use require the tractor to be used upon side hills all the furrows may be turned downwardly.

Having thus fully described my said invention, what I claim as new and desire to secure by Letters Patent, is:

1. A tractor embodying a frame, a motor section articulated to the frame and adapted to swing upon a vertical pivot relative thereto, steering wheels at the end of the frame opposite the motor section, a segment formed upon the motor section concentric with the pivot of the motor section, a pinion engaging the segment for swinging the motor section upon its pivot, means for engaging the segment to lock the motor section rigid with the frame, and means to move the wheels opposite the motor section for steering purposes.

2. A tractor embodying a frame, a motor section pivoted thereto upon a vertical pivot, means to swing the motor section about its vertical pivot for steering purposes, means to lock the motor section against swinging relative to the frame, wheels supporting the frame at the end opposite the motor section, and means to move the wheels for steering purposes.

3. A motor embodying a frame, a motor section articulated to the frame and adapted to swing about a vertical pivot, a segment carried by the motor section concentric with the vertical pivot, a pinion engaging the segment, manual means for rotating the pinion for steering purposes, manually controlled detents for engaging the segment to lock the motor section from swinging relative to the frame, wheels supporting the frame at the end opposite the motor section, manual means for swinging the wheels for steering purposes, and manually controlled means for locking the wheels against swinging action.

4. A tractor embodying a frame, a reach pivoted to the frame upon normally vertical and horizontal pivots, a prime mover mounted upon the frame, an axle fixedly connected with the reach, a back-bone pivoted to the reach upon a normally horizontal pivot and to the frame upon a normally vertical pivot, wheels journaled upon axis rigid with the frame, wheels dirigible relative to the fixed axle, and means to transmit power from the prime mover to some of the wheels.

5. A tractor embodying a frame, a reach pivoted to the frame upon normally vertical and horizontal pivots, a prime mover mounted upon the frame, an axle fixedly connected with the reach, a back-bone pivoted to the reach upon a normally horizontal pivot and to the frame upon a normally vertical pivot, wheels journaled upon axis rigid with the frame, wheels dirigible relative to the fixed axle, means to lock the frame against movement relative to the reach, means to lock the dirigible wheels relative to the reach, independent means for steering the tractor by operating the pivoted frame and the dirigible wheels separately and independently, and means to transmit power from the prime mover to some of the wheels.

In witness whereof, I have hereunto set my hand and seal at Elmira, New York, this 22nd day of July, A. D. nineteen hundred and nineteen.

CHARLES KINNEY. [L. S.]

Witnesses:
W. E. VUNK,
CHARLES VAN DUZER.